UNITED STATES PATENT OFFICE.

CHARLES LENNIG, OF PHILADELPHIA, PENNSYLVANIA.

IMPROVEMENT IN REMOVING TIN FROM TIN-SCRAP.

Specification forming part of Letters Patent No. 121,948, dated December 19, 1871.

*To all whom it may concern:*

Be it known that I, CHARLES LENNIG, of Philadelphia, in the county of Philadelphia, in the State of Pennsylvania, have invented a new and Improved Method of Removing Tin from Metallic Surfaces coated or tinned with that metal, and thus making the same useful, by its recovery, as metal or in combination with other substances; and I do hereby declare that the following is a full and exact description thereof.

To recover tin from tin-plated metals, such as tinned iron or copper, especially from waste clippings of these, I place the clippings or tin-coated metals into an iron vessel, wrought or cast—any vessel will answer; but these are best—of such capacity and form as is deemed adequate for the quantities to be treated; this vessel to have a valve or stop-cock in its bottom to permit the free discharge of liquid. Into the same vessel, to within a few inches of its bottom, I carry one or more pipes, (iron is best,) these pipes being connected with an air-pump or ventilator, so as to be enabled to drive a current of air through them. A solution of caustic soda or potash, of about 1.200 specific gravity, is poured over the metallic surfaces or clippings to be treated, by the aid of a pump, air-elevator, or *monte-jus*, so as to drench them thoroughly. The liquor is immediately drawn off into a cistern or reservoir, and then currents of air are driven, by the aid of the pipes and ventilator, through the clippings for a few minutes, when the previously drawn-off caustic liquid is again pumped over the clippings; and this alternative process of passing air through, drenching and redrenching the clippings with the same liquid, is continued until the tin or tinning has been entirely removed from the metal that had been coated with it, which a few hours will generally effect, and can be materially accelerated by warming the liquid and the air, the chemical process in this being that surfaces of tin moistened with an alkali, such as potash or soda in a caustic state, will absorb the oxygen of the air brought into contact with such surfaces; whereas the process hitherto employed has been either to boil alkaline solutions with tin and oxides of lead, or melting caustic alkalies at a high temperature with tin, in the first process, reducing the oxides of lead into metallic lead, and the oxygen, being appropriated by the tin, which then, as stannic acid, combines with the alkalies. In the second or melting process the water of the caustic alkalies being decomposed hydrogen is evolved and the oxygen passes onto the tin, producing stannic acid, combining with the alkalies. My process, therefore, is simply oxidation by the oxygen of the air, which takes place when surfaces of tin moistened and kept moistened with alkaline solutions, but not submerged or covered therewith, are sufficiently long exposed to currents of air. The first charge of clippings is then removed and a fresh one substituted, and a third, and so on, as often as the tin becomes dissolved and removed, and when this action ceases then a fresh portion of caustic soda or potash is used in the process. The saturated solution has been mostly converted into stannate of soda and potash by the action of the oxygen of the air in contact with the moist alkali and tin, having converted the tin into stannic acid or binoxide, which has combined with the alkali of the solution, which, being now evaporated in iron or other vessels as long as a sedimentary salt separates from the solution, which, being raked or scooped out from the liquid as fast as formed and placed on a proper separator or drainer for drainage, is the stannate of soda or potash in a fit state for use or sale after being slightly washed with water. The residuary liquid, which deposits no more or very little salt by evaporation, is again diluted with water to about 1.200 specific gravity and reused for the treatment of tinned metal.

If it is desirable to recover the tin in a metallic form, the stannate obtained as above is dried, perfectly mixed with fifteen to twenty per cent. of finely-powdered coal, and, in a crucible or proper reverberatory furnace, subjected to a sufficient temperature, which will reduce the tin in the stannate to metal, to be cast into bars or ingots.

I do not confine myself to the apparatus herein described for removing tin from tinned metallic surfaces, as that may be varied in many ways, such as rotating in the liquid and air alternately, &c.; but any apparatus or arrangement will apply that brings air or oxygen into contact alternately with tinned surfaces washed or moistened with alkaline solutions, as herein described.

I do not claim the process of reducing tin to a metallic state from the stannate of the alkali by mixing coal and reducing in a crucible by heat; but

I claim as my invention and desire to secure by Letters Patent—

1. The recovery of tin from tinned metallic surfaces, in the shape of stannate of soda or potash or as a metallic tin, by the use of caustic alkalies and air alone, oxidizing the tin by the absorption of oxygen from air direct when moistened with alkaline solutions, by the process substantially as herein described.

2. The process of making stannate of soda or potash from tin adhering to tinned metallic surfaces as well as from tin direct, by the use of caustic alkalies, by oxidizing the tin directly with the oxygen of the air, substantially as herein described.

3. The recovery of tin in metallic form from tinned metallic surfaces, by the process substantially as herein described.

Philadelphia, May 29, 1871.

CHARLES LENNIG.

Witnesses:
N. LENNIG,
E. CORLIES.

(136)